July 12, 1932.     D. SMITH     1,867,387
INDICATING GAUGE
Filed May 28, 1930
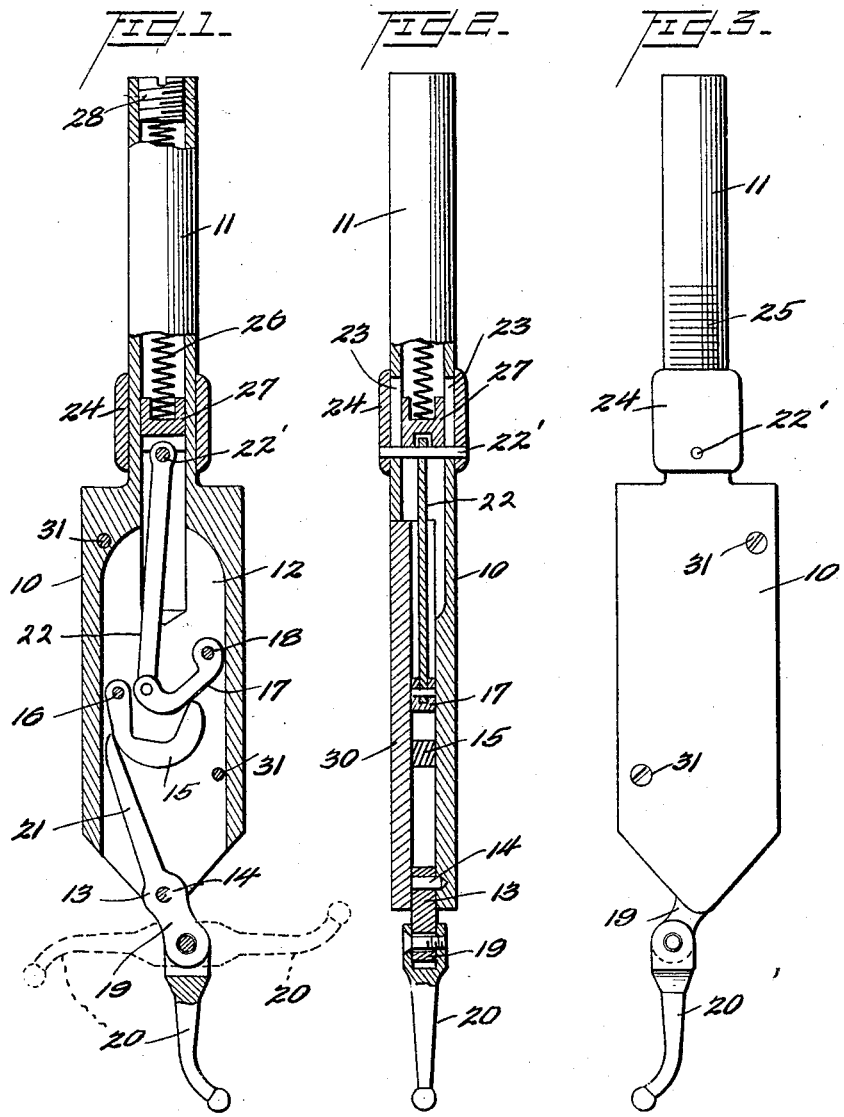
Inventor
David Smith
By Edward C. Sasnett
Attorney

Patented July 12, 1932

1,867,387

UNITED STATES PATENT OFFICE

DAVID SMITH, OF HAMILTON, OHIO

INDICATING GAUGE

Application filed May 28, 1930. Serial No. 456,420.

This invention relates to indicating gauges for machine shop use in locating and lining up work on milling machines, lathes, drill presses and the like.

The general object of the invention is to provide an indicating gauge which is simple in construction, easy to handle, capable of convenient application to a large variety of machine tools and which can be read when in motion by an operator located at various angles of view.

The accompanying drawing illustrates an embodiment of the invention which has been found in practice to be highly satisfactory. Referring thereto:

Fig. 1 is a longitudinal sectional view of my indicating gauge;

Fig. 2 is a longitudinal section taken on a plane at right angles to the plan of Fig. 1; and Fig. 3 is a side elevation.

The frame of the indicating gauge illustrated consists of a flat metal plate 10 of elongated rectangular form which is beveled at one end and at its other end is integrally formed with a tubular stem 11. The plate 10 is recessed in one face to form a chamber 12 in which is mounted the motion transmission and multiplying mechanism of the gauge. This mechanism comprises a two-arm lever 13 pivoted on a transverse pin 14 secured in the recessed face of plate 10 adjacent the apex of its beveled end, a curved cam lever 15 pivoted on a pin 16 and a cam lever 17 pivoted on a pin 18.

The lever 13 has a relatively short arm 19 which projects from the end of plate 10 and has pivoted to its extremity an arm 20, hereinafter termed a stylus, having a spherical end adapted to engage the work, this stylus being pivoted to arm 19 by a friction joint which permits the stylus to be moved to different angular positions with respect to arm 19 where it is frictionally held, as indicated by the dotted lines in Fig. 1.

Lever 13 has a relatively long arm 21 which engages the edge of cam lever 15, the extremity of the latter engaging the edge of cam lever 17. A link 22 is connected to the end of cam lever 17 and extends into the bore of stem 11 where it is pivoted to a transverse pin 22' which extends through longitudinal slots 23 in stem 11 and has its ends fixed in a fiber collar 24 surrounding the stem and cooperating with indicating marks 25 on the stem.

The parts are yieldingly held in the positions illustrated by means of a coil spring 26 in the bore of stem 11, this spring bearing at one end on a cylindrical plug or seat 27 slidable in the bore of stem 11 and held by the spring against pin 22' and bearing at its other end against a screw plug 28 closing the end of the stem.

A cover plate 30 is fixed on the recessed face of plate 10 by screws 31.

The gauge described is adapted for use on machine tools of a wide variety of types. In applying it for centering work on a boring machine, for example, the shank, or body 10, of the gauge is mounted on the spindle chuck, or collet, of the machine and the finger, or stylus, 20 being brought in contact with the part to be bored, the machine is allowed to rotate slowly. If the work is off center the stylus 20 will be moved about pin 14 and the movement transmitted and multiplied to the indicating collar 24, the latter reciprocating on the stem 11. The operator will then manipulate the work until the collar remains stationary with respect to the stem, thus indicating that the work is accurately centered. The indications of the gauge can be easily observed by the operator while the gauge is slowly rotating bodily and as the gauge does not require any manipulation after being mounted in place the operator has his hands free to position the work in accordance with the indications.

Now having fully described my invention, what I claim as new and desire to secure by Letters Patent of the United States is:

1. An indicating gauge comprising an elongated rectangular body and a tubular stem integral with one end thereof and formed with a longitudinal slot, said body having a recess in one face which communicates with the bore of said stem and extends throughout the length of the body, a lever pivoted in said recess adjacent the open end thereof and having relatively short and long arms projecting from the body and into the recess respectively, a curved cam lever pivoted in said recess and engaged by the long arm of said lever, a second cam lever pivoted in said recess and engaged by the first mentioned cam lever, an indicating collar slidable on said stem and carrying a pin which extends through the longitudinal slot in said stem, a link connecting the free end of the second cam lever to said pin, a coil spring in said stem yieldingly holding said pin at the lower end of said slot and a cover plate secured to said body over the recess therein.

2. An indicating gauge, comprising a casing having a tubular stem which is provided with a longitudinal slot and a longitudinal scale upon its outer surface, a lever pivotally mounted upon the casing and having a long arm projecting into the casing and a short arm projecting exteriorly of the casing, a curved cam lever pivoted within the casing and engaged by the long arm of the lever near its pivot, a second cam lever pivoted within the casing at a point remote from the pivot of the first-named cam and engaged by the free end of the cam lever, an indicating collar slidable upon said tubular stem, a pin secured to the collar and extending through the slot into the tube, a link connecting the free end of the second-named cam lever with the pin, a spring within the stem to yieldingly oppose the movement of the pin in one direction, and a stylus angularly adjustably connected with the short arm of the lever.

In testimony whereof I hereunto affix my signature.

DAVID SMITH.